(12) United States Patent
Khakpour et al.

(10) Patent No.: US 11,605,507 B1
(45) Date of Patent: Mar. 14, 2023

(54) MICROSUPERCAPACITORS AND METHODS OF FABRICATING THE SAME

(71) Applicants: Iman Khakpour, Miami, FL (US); Amin Rabiei Baboukani, Miami, FL (US); Shahrzad Forouzanfar, Miami, FL (US); Anis Allagui, Sharjah (AE); Chunlei Wang, Miami, FL (US)

(72) Inventors: Iman Khakpour, Miami, FL (US); Amin Rabiei Baboukani, Miami, FL (US); Shahrzad Forouzanfar, Miami, FL (US); Anis Allagui, Sharjah (AE); Chunlei Wang, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/839,984

(22) Filed: Jun. 14, 2022

(51) Int. Cl.
*H01G 11/36* (2013.01)
*H01G 11/86* (2013.01)
*H01G 11/70* (2013.01)
*H01G 11/24* (2013.01)

(52) U.S. Cl.
CPC ............. *H01G 11/36* (2013.01); *H01G 11/24* (2013.01); *H01G 11/70* (2013.01); *H01G 11/86* (2013.01)

(58) Field of Classification Search
CPC ......... H01G 11/36; H01G 11/24; H01G 11/70
See application file for complete search history.

(56) References Cited

U.S. PATENT DOCUMENTS

| | | | | |
|---|---|---|---|---|
| 2014/0029161 | A1* | 1/2014 | Beidaghi | H01G 11/24 427/80 |
| 2016/0133395 | A1* | 5/2016 | Yoo | H01G 11/36 29/25.03 |
| 2018/0355194 | A1* | 12/2018 | Yadavalli | H01G 11/36 |
| 2020/0002174 | A1* | 1/2020 | Tour | C01B 32/18 |

OTHER PUBLICATIONS

Beidaghi et al., Micro-Supercapacitors Based on Interdigital Electrodes of Reduced Graphene Oxide and Carbon Nanotube Composites with Ultrahigh Power Handling Performance, Adv. Funct. Mater., 2012, 22, 4501-4510 (Year: 2012).*

Yoon et al, Vertical Alignments of Graphene Sheets Spatially and Densely Piled for Fast Ion Diffusion in Compact Supercapacitors, ACSNano, vol. 8, No. 5, 4580-4590, 2014 (Year: 2014).*

Mochizuki et al. Vertically Aligned Graphite Oxide Nanosheet Film and its Application in a High-Speed Charge/Discharge Electrochemical Capacitor, Appl. Energy Materia. 2019, 2, 1033-1039 (Year: 2019).*

* cited by examiner

Primary Examiner — Eric W Thomas
(74) Attorney, Agent, or Firm — Saliwanchik, Lloyd & Eisenschenk

(57) ABSTRACT

Microsupercapacitors (MSCs), as well as methods of fabricating the same and methods of using the same, are provided. An MSC can include interdigitated microelectrodes having reduced graphene oxide (rGO) (e.g., vertically aligned nanosheets thereof) disposed on upper surfaces of the microelectrodes. The MSC can be fabricated by preparing a micro-current collector (MCC) comprising the interdigitated microelectrodes using photolithography and then performing a bipolar electrochemistry process on the MCC to deposit rGO on the upper surfaces of the interdigitated microelectrodes (e.g., in a single-step in situ exfoliation, reduction, and deposition).

15 Claims, 6 Drawing Sheets

| Materials | $\varphi_{120}$ (deg) | $f_0$ (Hz) | $C_A$ ($\mu F\,cm^{-2}$) |
|---|---|---|---|
| Azulene-bridged coordination polymer framework (PiCBA) | -73 | 3620 | 0.014 (at 120 Hz) |
| Direct laser writing of graphene made from chemical vapor deposition | -76.2 | 2025 | 15 (at 200 V s$^{-1}$) |
| Charge transfer salt and graphene heterostructure-based | -73.2 | 3056 | 151 (at 120 Hz) |
| Metallic 1T-Phase MoS$_2$ | -79 | 1221 | NA |
| RIE reduced graphene oxide | -68 | 3579 | 13.5 (at 200 V s$^{-1}$) |
| Composite of MXene and MWCNT | -79 | 2000 | 600 (at 120 Hz) |
| Inkjet-Printed NiO | -25 | 33 | NA |
| Catechol-coordinated framework film (Cu-DTHAB film) | -84 | 16374 | 0.96 (at 120 Hz) |
| High aspect ratio 3D nanoporous gold | -61 | 250 | 800 (at 200 V s$^{-1}$) |
| Oriented coordination polymer (Cobalt benzenetetramine tetrahydrochloride) | -78.6 | 6812 | 9 (at 120 Hz) |
| Reduced Graphene Oxide and Carbon Nanotube Composites | -62 | 208 | NA |
| B/N-Enriched semi-conductive polymer film | -67 | 1910 | 28 (at 200 V s$^{-1}$) |
| Present work | -81.2 | 3486 | 65.2 (at 120 Hz) |

FIG. 6

MICROSUPERCAPACITORS AND METHODS OF FABRICATING THE SAME

GOVERNMENT SUPPORT

This invention was made with government support under 1648451 awarded by the National Science Foundation. The government has certain rights in the invention.

BACKGROUND

Given the recent developments in the fabrication of microelectronic devices, embedded micro-sized energy storage systems that can be directly integrated with other microelectronic components are becoming more and more in demand. Microsupercapacitors (MSCs) are considered promising alternatives to bulky electrolytic capacitors or batteries for on-chip applications given their simplicity in design, long lifetime, low heating effects, and safety considerations. In addition, being two-terminal devices, MSCs can be connected in parallel and/or in series to meet the required capacity, voltage, and current of an intended load. Supercapacitors can be categorized into three groups based on the charge storage mechanisms—electrical double-layer capacitors (EDLCs), pseudocapacitors, and hybrid capacitors—and, as such, their specifications and applications vary accordingly. EDLCs store the electrical charge in the double-layer structure formed at the electrolyte/electrode interface and exhibit much faster response when compared to the other two types. However, the frequency response of EDLCs, which is typically in the range of several hundred milliseconds to several seconds, is still lagging behind that of conventional aluminum electrolytic capacitors (AEC), which is typically in the range of several milliseconds. When applied to MSCs, even though the short diffusion paths between the microelectrodes lower their time constants, the mechanistic weakness still limits their high-frequency on-chip applications.

BRIEF SUMMARY

Embodiments of the subject invention provide novel and advantageous microsupercapacitors (MSCs), as well as methods of fabricating the same and methods of using the same. An MSC can include interdigitated microelectrodes having reduced graphene oxide (rGO) (e.g., vertically aligned nanosheets thereof) disposed on upper surfaces of the microelectrodes. The MSC can have a high capacitance and high stability even after 50,000 cycles. The MSC can be fabricated by preparing a micro-current collector (MCC) comprising the interdigitated microelectrodes using photolithography and then performing a bipolar electrochemistry process on the MCC to deposit rGO on the upper surfaces of the interdigitated microelectrodes (e.g., in a single-step in situ exfoliation, reduction, and deposition).

In an embodiment, an MSC can comprise: a plurality of interdigitated microelectrodes; and rGO disposed on the plurality of interdigitated microelectrodes, where a combined total surface area of an upper surface of each interdigitated microelectrode of the plurality of interdigitated microelectrodes is no more than 30 square millimeters ($mm^2$). The MSC can have an average capacitance of, for example, at least 500 (or at least 600 or at least 640) microFarads per square centimeter ($\mu F/cm^2$) at a scan rate of 2 millivolts per second (mV/s). The MSC can have no rGO in any spaces between the interdigitated microelectrodes of the plurality of interdigitated microelectrodes, and the rGO can be present only on the upper surfaces of the interdigitated microelectrodes of the plurality of interdigitated microelectrodes and not on any other surfaces thereof (due to the sacrificial photoresist being present during fabrication). The MSC can further comprise a substrate (e.g., silicon and/or silicon nitride) on which the plurality of interdigitated microelectrodes is disposed. The interdigitated microelectrodes of the plurality of interdigitated microelectrodes can each comprise a metal material (e.g., gold) or an electrically conductive carbon (e.g., a carbon cloth). The rGO can cover at least 60% (or at least 70%, at least 80%, at least 90%, at least 95%, or at least 99%) of the upper surface of each interdigitated microelectrode of the plurality of interdigitated microelectrodes. The rGO can be disposed on the plurality of interdigitated microelectrodes as vertically aligned nanosheets of the rGO. The MSC can comprise a first microelectrode side and a second microelectrode side physically separated from the first microelectrode side, the first microelectrode side comprising half of the interdigitated microelectrodes of the plurality of interdigitated microelectrodes, and the second microelectrode side comprising the other half of the interdigitated microelectrodes of the plurality of interdigitated microelectrodes. A total volume of the MSC can be, for example, less than 0.2 cubic millimeters ($mm^3$).

In another embodiment, a method of fabricating an MSC can comprise: preparing an MCC comprising a substrate, a plurality of interdigitated microelectrodes disposed on the substrate, and a sacrificial photoresist disposed on the substrate (e.g., such that only an upper surface of each interdigitated microelectrode of the plurality of interdigitated microelectrodes is exposed); disposing the MCC on a negative feeding electrode; providing a positive feeding electrode, a first bipolar electrode, a second bipolar electrode, and the negative feeding electrode with the MCC disposed thereon in water, where the first bipolar electrode and the second bipolar electrode each comprise graphite, and the MCC is disposed such that the plurality of interdigitated microelectrodes faces at least one of the first bipolar electrode and the second bipolar electrode; applying a direct current (DC) voltage to the positive feeding electrode and the negative feeding electrode to perform a single-step exfoliation, reduction, and deposition of graphene nanosheets on the plurality of interdigitated microelectrodes to produce the MSC, where the graphene nanosheets deposited on the plurality of interdigitated microelectrodes comprise (or are exclusively) reduced graphene oxide (rGO); removing the MSC from the negative feeding electrode; and performing a first cleaning the MSC to remove the sacrificial photoresist from the substrate. The preparing of the MCC can comprise: disposing a first photoresist on the substrate; patterning the first photoresist using a mask and first radiation to give a first patterned photoresist; developing the first patterned photoresist; disposing a material of the plurality of interdigitated microelectrodes on the substrate and the first patterned photoresist; performing a lift-off step to remove the first patterned photoresist, resulting in the plurality of interdigitated microelectrodes disposed on the substrate; depositing a second photoresist on the substrate and the plurality of interdigitated microelectrodes; patterning the second photoresist using the mask and second radiation to give a second patterned photoresist; and developing the second patterned photoresist, resulting in the sacrificial photoresist and the plurality of interdigitated microelectrodes disposed on the substrate. The method can further comprise, after performing the first cleaning the MSC to remove the sacrificial photoresist from the substrate, performing a second cleaning on the MSC by washing the MSC in a solvent (e.g., isopropyl alcohol) and/or deionized water and drying the MSC with a gas (e.g., nitrogen gas). The water in which the positive feeding electrode, the first bipolar electrode, the second bipolar electrode, and the negative feeding electrode are disposed can be deionized water (e.g., deionized water with no additives, such that the positive feeding electrode, the negative feeding electrode, the first bipolar electrode, and the second bipolar electrode are disposed only in deionized water, with no additives included in the solution that is deionized water). The first bipolar electrode can be a first graphite rod, the second bipolar electrode can be a second graphite rod, and/or the first bipolar electrode and the second bipolar electrode can be connected to each other by that is disposed entirely outside the water. The rGO can be present only on the upper surfaces of the interdigitated microelectrodes of the plurality of interdigitated microelectrodes and not on any other surfaces thereof, and the MSC can comprise no rGO in any spaces between the interdigitated microelectrodes of the plurality of interdigitated microelectrodes. The rGO can cover at least 60% (or at least 70%, at least 80%, at least 90%, at least 95%, or at least 99%) of the upper surface of each interdigitated microelectrode of the plurality of interdigitated microelectrodes. A combined total surface area of the upper surface of each interdigitated microelectrode of the plurality of interdigitated microelectrodes can be, for example, no more than 30 $mm^2$. The interdigitated microelectrodes of the plurality of interdigitated microelectrodes can each comprise a metal material (e.g., gold) or an electrically conductive carbon (e.g., carbon cloth). The rGO can be disposed on the plurality of interdigitated microelectrodes as vertically aligned nanosheets of the rGO. A total volume of the MSC can be, for example, less than 0.2 mm.

BRIEF DESCRIPTION OF DRAWINGS

FIG. 1(*b*) shows a perspective view of a system for bipolar exfoliation, according to an embodiment of the subject invention. The system can include the interdigitated MCC fabricated by the process of FIG. 1(*a*).

FIG. 2(*b*) shows a SEM image of vertically aligned graphene nanosheets deposited on the microelectrodes. The image in FIG. 2(*b*) is an enlargement of the square in FIG. 2(*a*). The scale bar is 1 μm.

FIG. 2(*c*) shows a plot of intensity versus wavenumber, showing the Raman spectrum of deposited graphene.

FIG. 3(*b*) shows a plot of potential (in V) versus time (in seconds (s)), showing galvanostatic charge-discharge results at current densities of 25 microamps per square centimeter ($\mu A/cm^2$)), 50 $\mu A/cm^2$, 100 $\mu A/cm^2$, and 250 $\mu A/cm^2$. The curve with the first peak (closest to 0 s) is for 250 $\mu A/cm^2$; the curve with the second peak (around 1 s) is for 100 $\mu A/cm^2$; the curve with the third peak (around 2 s) is for 50 $\mu A/cm^2$; and the curve with the fourth peak (around 4 s) is for 25 $\mu A/cm^2$.

FIG. 3(*c*) shows a plot of capacity (in microcoulombs per square centimeter ($\mu C/cm^2$) versus cycle number, showing the cycling performance (charge-discharge at 25 $\mu A/cm^2$) of a fabricated reduced graphene (rGO) micro-supercapacitor (MSC) (rGO-MSC).

FIG. 4(*b*) shows a plot of phase angle of Z (in degrees (deg)) versus frequency (in Hertz (Hz)), showing the bode phase plot for an Au-MCC, an rGO-MSC before cycling, and an rGO-MSC after cycling. The curve with the highest phase angle at 100 Hz is for the rGO-MSC before cycling; the curve with the second-highest phase angle at 100 Hz is for the rGO-MSC after cycling; and the curve with the lowest phase angle at 100 Hz is for the Au-MCC.

FIG. 4(*c*) shows a plot of the real part of the impedance (in kΩ) (or the device resistance) versus frequency (in Hz) for an Au-MCC, an rGO-MSC before cycling, and an rGO-MSC after cycling. The curve with the highest resistance at 1 Hz is for the Au-MCC; the curve with the second-highest resistance at 1 Hz is for the rGO-MSC before cycling; and the curve with the lowest resistance at 0.1 Hz is for the rGO-MSC after cycling.

FIG. 4(*d*) shows a plot of capacitance (in microFarads per square centimeter ($\mu F/cm^2$)) versus frequency (in Hz) for an Au-MCC, an rGO-MSC before cycling, and an rGO-MSC after cycling. The curve with the highest capacitance at 100 Hz is for the rGO-MSC after cycling; the curve with the second-highest capacitance at 100 Hz is for the rGO-MSC before cycling; and the curve with the lowest capacitance at 100 Hz is for the Au-MCC.

FIG. 5(*b*) shows a plot of voltage (in V) versus time (in s), showing the smoothing capability of an rGO-MSC subjected to a rectified 120 Hz wave when no load was connected to the circuit.

FIG. 5(*c*) shows a plot of voltage (in V) versus time (in s), showing the smoothing capability of an rGO-MSC subjected to a rectified 120 Hz wave when a 39 kΩ resistor was connected to the circuit as a load.

FIG. 5(*d*) shows a plot of voltage (in V) versus time (in s), showing the smoothing capability of a 10 microFarad (μF) commercial aluminum electrolytic capacitor (AEC) subjected to a rectified 120 Hz wave when a 39 kΩ resistor was connected to the circuit as a load.

FIG. 6 shows a table of the performance of different MSCs fabricated to operate in an AC line filtering application. The rGO-MSC of an embodiment of the subject invention is shown in the last line of the table, with the materials indicated as "Present work".

DETAILED DESCRIPTION

Figures 1A, 1B:
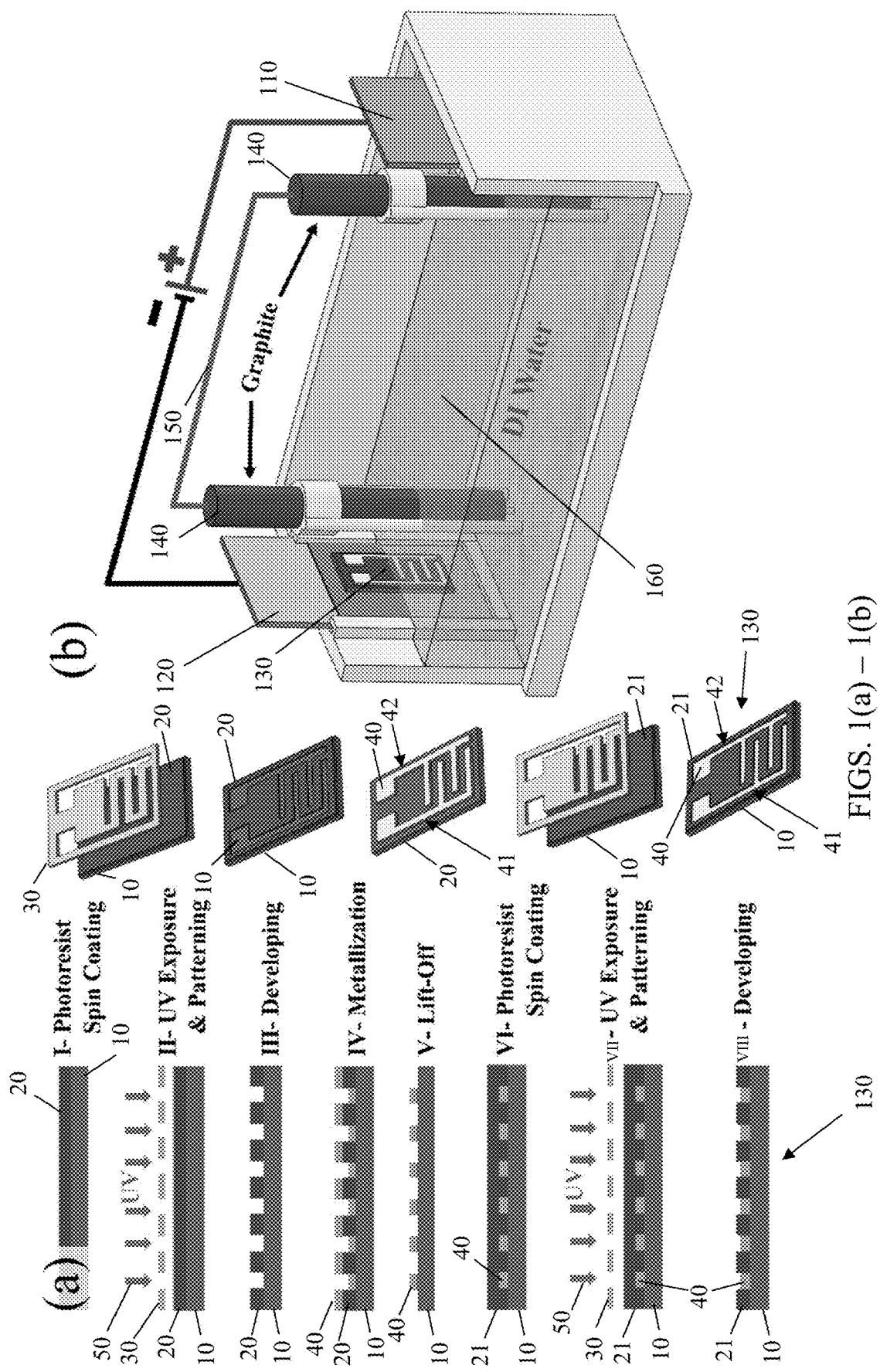
FIG. 1(*a*) shows a schematic view of a fabrication process for an interdigitated micro-current collector (MCC), according to an embodiment of the subject invention.

Embodiments of the subject invention provide novel and advantageous microsupercapacitors (MSCs), as well as methods of fabricating the same and methods of using the same. An MSC can include interdigitated microelectrodes having reduced graphene oxide (rGO) (e.g., vertically aligned nanosheets thereof) disposed on upper surfaces of the microelectrodes. The MSC can have a high capacitance and high stability even after 50,000 cycles. The MSC can be fabricated by preparing a micro-current collector (MCC) comprising the interdigitated microelectrodes using photolithography and then performing a bipolar electrochemistry process on the MCC to deposit rGO on the upper surfaces of the interdigitated microelectrodes (e.g., in a single-step in situ exfoliation, reduction, and deposition).

Among all the different available approaches, supercapacitors made by vertically aligned graphene electrodes show excellent performance at high frequencies because the unique microstructure can minimize the electronic and ionic resistances and therefore increase the response rate of the device. The complexity, associated costs, elevated temperatures, and vacuum system requirements make methods for attempting to fabricate vertically aligned graphene electrodes challenging for device fabrication. No related art methods or devices exist with vertically aligned graphene on miniaturized interdigitated supercapacitors. Embodiments of the subject invention can use bipolar electrochemistry as an in situ three-in-one (i.e., single-step) exfoliation, reduction, and deposition method to fabricate high quality layered or vertically aligned two-dimensional (2D) materials (e.g., graphene) in water (e.g., deionized water (DIW), such as DIW with no additives) at a safe temperature (e.g., room temperature), which is environmentally friendly, simple, and cost-effective.

A bipolar electrochemistry cell can comprise a conductive material (bipolar electrode (BE)) placed wirelessly between two feeding electrodes of a conventional cell. When the conductivity of the BE is higher than that of the electrolyte, an interfacial potential difference (IPD) appears between the farthest edges of the BE. The magnitude of this IPD linearly depends on the distance between the farthest edges of the BE and the electric field in the solution. In the case that the IPD value is high enough, it can initiate redox reactions on the (anodic and cathodic) edges of the BE or electrochemical exfoliation of the BE if it is made of layered van der Waals materials, (e.g., graphite).

Due to the capabilities and versatility of the bipolar electrochemistry method (e.g., vertically aligned reduced graphene oxide (rGO) on the negative feeding electrode) and the understanding of the mechanistic pathways of the exfoliation and deposition sequences, embodiments utilize the compatibility of bipolar electrochemistry with other semiconductor processing for the development of high-performance on-chip MSCs with a unique vertically aligned graphene microstructure. An interdigitated micro-current collector (MCC) comprising metal (e.g., a gold (Au) MCC (Au-MCC)) can be fabricated using a photolithography method. Bipolar electrochemistry can then be used to perform in situ exfoliation and deposition of vertically aligned reduced graphene oxide (rGO) on the MCC to give a MSC. As shown in the Examples herein, the electrochemical performance of the fabricated MSC in the time domain and frequency domain shows outstanding capacitive storage capability at high frequencies (e.g., about 65.2 microFarads per square centimeter ($\mu F/cm^2$) at 120 Hertz (Hz) and 55 $\mu F/cm^2$ at 1000 Hz). Also, the MSC device has been tested and validated in a practical alternating current (AC) line filtering circuit, which is promising for on-chip microelectronic applications.

In an embodiment, a MCC can be fabricated using photolithography. FIG. 1(a) shows a fabrication process for the MCC. Referring to FIG. 1(a), step I comprises spin coating a photoresist 20 on a substrate 10, followed by soft baking the substrate 10 with the photoresist 20. Step II comprises patterning the photoresist 20 using a mask 30 and ultraviolet (UV) light 50. Step III comprises developing the photoresist 20 (e.g., using a developer), followed by a bake and then a cleaning (e.g., with $O_2$ plasma) to remove any remaining photoresist that was supposed to be removed during patterning (e.g., via reactive ion etching (RIE)). Step IV comprises metallization by depositing at least one metal 40 (e.g., chromium (Cr) and/or Au) using, for example, an evaporator. Step V comprises lift-off, where the photoresist 20 with metal 40 disposed thereon is lifted off; this can be done, for example, in a sonication bath using a solvent followed by an optional rinse and subsequent dry. Step VI comprises repeating step I to deposit photoresist 21 again. Step VII comprises repeating Step II to pattern the photoresist 21, and Step VIII comprises repeating Step III to develop the photoresist 21 and remove any excess on the metal 40. Steps VI-VIII are performed to prevent or inhibit lateral growth and deposition of graphene in between the microelectrodes of metal 40 (when the bipolar electrochemistry deposition of graphene is performed on the MCC 130) by providing a sacrificial photoresist 21. The microelectrodes can include a first microelectrode side 41 and a second microelectrode side 42 physically and/or electrically separated from the first electrode side 41, each microelectrode side 41,42 comprising a plurality of interdigitated microelectrodes and optionally a microelectrode pad (e.g., where the line from the 40 is touching in both instances on the right side of FIG. 1(a)).

Each interdigital microelectrode of the MCC 130 can have a length of, for example, any of the following values, about any of the following values, at most any of the following values, or at least any of the following values (all values are in millimeters (mm)): 1, 2, 3, 4, 5, 5.5, 6, 6.04, 6.1, 6.5, 7, 8, 9, or 10. For example, each interdigital microelectrode of the MCC 130 can have a length of no more than 7 mm (e.g., 6.04 mm or about 6.04 mm). Each interdigital microelectrode of the MCC 130 can have a width of, for example, any of the following values, about any of the following values, at most any of the following values, or at least any of the following values (all values are in micrometers ($\mu m$)): 50, 60, 70, 80, 90, 95, 96, 97, 98, 99, 100, 101, 102, 103, 104, 105, 110, 120, 130, 140, 150, 200, 225, 250, 275, 300, 350, or 400. For example, each interdigital microelectrode of the MCC 130 can have a width of no more than 130 $\mu m$ (e.g., 100 $\mu m$ or about 100 $\mu m$). A total surface area of an upper surface of the microelectrodes (both sides 41,42) of the MCC can be, for example, any of the following values, about any of the following values, at most any of the following values, or at least any of the following values (all values are in square millimeters ($mm^2$)): 5, 6, 7, 8, 9, 9.5, 9.66, 10, 11, 12, 13, 14, 15, 16, 17, 18, 19, 19.328, 20, 25, 30, 35, 40, 45, 50, 55, 60, 65, 70, 75, 80, 85, 90, 95, or 100. For example, A total surface area of an upper surface of the microelectrodes of the MCC can be no more than 30 $mm^2$ (e.g., 19.328 $mm^2$ or about 19.328 $mm^2$). A volume of the MCC (without packaging) can be, for example, any of the following values, about any of the following values, at most any of the following values, or at least any of the following values (all values are in cubic millimeters ($mm^3$)): 0.02, 0.03, 0.04, 0.05, 0.06, 0.07, 0.08, 0.09, 0.10, 0.11, 0.12, 0.13, 0.14, 0.15, 0.20, 0.25, 0.30, 0.35, 0.40, 0.45, or 0.50. For example, a volume of the MCC (without packaging) can be no more than 0.10 $mm^3$ (e.g., 0.04 $mm^3$ or about 0.04 $mm^3$).

FIG. 1(b) shows a perspective view of a bipolar electrochemistry cell used for deposition of vertically aligned rGO on the MCC 130. Two bipolar electrodes 140 (e.g., graphite rods), a positive feeding electrode 110, and a negative feeding electrode 120 can be disposed in a solution 160 (e.g., water, such as DIW (e.g., DIW with no additives)). The bipolar electrodes 140 can be connected to each other via a wire 150 outside the solution 160. The MCC 130 fabricated using the process of FIG. 1(a) can be disposed on the negative feeding electrode 120. The MCC can be disposed such that the metal 40 of the interdigitated microelectrodes can be facing towards the bipolar electrodes 140. The feeding electrodes 110,120 can comprise a metal material (e.g., stainless steel (SS)). The bipolar electrodes 140 can be disposed closer to the respective feeding electrodes 110,120 (to which they are respectively closest) than they are to each other. A voltage (e.g., a direct current (DC) voltage, such as a 45 V DC voltage) can be applied to the feeding electrodes 110,120 for a predetermined period of time (e.g., 24 hours or about 24 hours). Magnet stirring can optionally be performed during the process of when the voltage is being applied, and this can be done using for example a magnet rod (e.g., a 1 centimeter (cm)-long magnet rod) with a predetermined rotational speed (e.g., 150 revolutions per minute (rpm) or about 150 rpm). Vertically aligned rGO is deposited on the metal 40 of the MCC 130, resulting in a fabricated MSC (element 130 after the deposition of rGO on the metal 40). The MSC can then be detached from the negative feeding electrode 120 and optionally cleaned (e.g., emerged in a solvent for a predetermined amount of time) to remove the sacrificial photoresist 120. The MSC can then optionally be cleaned (e.g., washed in a solvent (e.g., isopropyl alcohol (IPA) and/or water (e.g., DIW)) and dried (e.g., with nitrogen ($N_2$) gas).

As an alternative to the MCC with a metal 40, carbon cloth and interdigitated carbon microelectromechanical systems (C-MEMS) with a three-dimensional (3D) structure can also been used as the MCC 130 for deposition of rGO on different substrates. In this case, the carbon cloth would take the place of the metal 40.

The length of each interdigital microelectrode, the width of each interdigital microelectrode, the surface area of the upper surface of the MSC (having the interdigital microelectrodes disposed thereon), and a volume of the MSC (without packaging), can be the same as those listed above for the MCC.

Embodiments of the subject invention provide vertically aligned graphene-based MSCs for high-frequency applications, as well as methods for fabricating the same. A modified bipolar electrochemistry process can be employed to deposit vertically aligned and highly reduced rGO nanosheets on an MCC (e.g., an Au-MCC). The lateral growth of graphene sheets between the microelectrode fingers that can otherwise occur during the bipolar electrochemistry process can be inhibited or prevented by adding a sacrificial layer of photoresist between the fingers. The time-domain and frequency-domain electrochemical analysis of the rGO-MSC devices demonstrate excellent stability and high performance for both energy storage at close-to-DC-frequencies as well as filtering capabilities for AC line filtering applications (see the Examples). In particular, from the EIS results, the deviation from ideal capacitive behavior was very small at low frequencies and promising capacitive performance at high frequencies was observed. The use of rGO-MSCs in a standard 60 Hz AC filtering circuit showed that the device accomplished excellent flattening performance comparable to a relatively bulky and massive off-the-shelf AEC.

Certain aspects of U.S. Pat. Nos. 11,034,584 and 11,352,703 are relevant to embodiments of the subject invention, and both of these documents are hereby incorporated by reference herein in their entireties.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The morphology of the deposited graphene on the interdigitated MCC was investigated using a JEOL 7000 scanning electron microscope (SEM). Raman analysis was carried out on a Raman spectrometer (in backscattering configuration) equipped with an argon-ion laser (Spectra Physics Model 177, 514 nm, 400 mW) and HoloSpec f/1.8i, Kaiser optical spectrograph.

The electrochemical performance of the MSCs was evaluated in a two-electrode symmetric configuration, where one set of microelectrodes acted as the working electrode, and the other one was considered as the counter electrode and reference electrode. The MSCs were immersed in 1 mole per liter (mol/L) $Na_2SO_4$ for one hour before starting the measurements. A VMP3 Bio-Logic multichannel potentiostat was used to evaluate the electrochemical performance of fabricated devices using cyclic voltammetry (CV), galvanostatic charge/discharge (GCD), and electrochemical impedance spectroscopy (EIS) techniques. The CV tests were conducted at scan rates from 2 millivolts per second (mV/s) to 5000 mV/s, and the GCD tests at loading currents from 25 microamps per square centimeter ($\mu A/cm^2$) to 250 $\mu A/cm^2$, both with the potential limits of 0 V to 0.8 V. For EIS measurements, the fully discharged MSCs (the DC voltage was around 0 V) were subjected to a 30 millivolt (mV) amplitude sinusoidal voltage with stepped frequencies from 1 megahertz (MHz) down to 100 millihertz (mHz) (six frequency points per decade). The reported current and capacitance were normalized by the surface area of the microelectrodes (i.e., 9.66 mm$^2$ for each electrode side on the MSC).

In order to evaluate the performance of the MSC as an AC line filter, it was used in a standard AC to DC circuit in which an input 60 Hz, $V_{peak}=\pm 1.0$ V sinusoidal wave was rectified through a diode bridge resulting in a 120 Hz, $V_{peak} \simeq +0.8$ V rectified wave. Both open circuit and loaded circuit (with a 39 kΩ resistor) were used for validating the filter performance. The MSC was separated by a switch from the rest of the circuit, so that the change in the output waveform of the filter could be monitored. Reference experiments were carried out using a commercial AEC (rated 10 microFarads (F), 16 V).

Example 1

An interdigitated Au MCC (Au-MCC) was fabricated by photolithography, according to the process shown in FIG. 1(a). A 4-inch silicon (Si)/silicon nitride (SiN) (100) wafer was first spin-coated by hexamethyldisilazane (HMDS) as the adhesion promoter and then by AZ® 1518 (from Microchemicals) as the photoresist at a rotational speed of 500 rpm for 10 seconds (s) and then 2900 rpm for 30 s. A soft baking of the wafer was conducted for 60 s at 100° C. on a hot plate. The wafer was then patterned by an OAI 800 mask aligner with a UV dose of 60 millijoules per square centimeter (mJ/cm$^2$). After the exposure step (the UV dose), the development of the photoresist was carried out using diluted AZ® 400 metal ion free (MIF) (4:1 volume ratio of DIW to the developer) for about 60 s. The wafer was baked for 20 s at 65° C. and then 70 s at 115° C. Next, an O$_2$ plasma cleaning was conducted to remove the remaining photoresist by RIE at 100 Watts (W) power for 60 s. Then, e-beam evaporation was used for metallization of Cr/Au (20 nanometers (nm)/100 nm) using a CHA evaporator. Lift-off was carried out in a sonication bath using AZ® EBR solvent for 2 hours, followed by acetone and IPA rinsing, and then drying with N$_2$ gas. A sacrificial photoresist layer was applied and patterned between the interdigitated electrodes by repeating all the above steps, up until the metallization step, on the wafer with the Au microelectrodes disposed thereon.

An optical microscopic checkout confirmed the fidelity of pattern transfer with interdigitated Au-MCC (thickness of about 120 nm) separated by sacrificial photoresist patterns (thickness of about 2 μm). There were 32 interdigital fingers in total on each Au-MCC (16 for each electrode side) with lengths and widths of 6040 μm and 100 μm, respectively. This resulted in a geometrical surface area of 9.66 mm$^2$ on each side of the Au-MCC (or 19.328 mm$^2$ total for both electrode sides). Based on the footprint area and the thickness of the electrodes, the device occupied as low as about 0.04 cubic millimeters mm$^3$ without packaging.

Example 2

A bipolar electrochemistry cell (as depicted in FIG. 1(b)) was designed and the container for the elements of the cell was 3D printed using polylactic acid (PLA) filament. DIW was provided to the container, and the positive and negative feeding electrodes were placed in the DIW. Each feeding electrode was SS 316 (size of 2 cm×1 cm), and the distance between the two feeding electrodes was 9 cm. Two graphite rods were placed between the feeding electrodes in a way that the distance of the farthest edges of the two graphite rods was 7 cm from each other. These two graphite rods were electrically wired to each other outside of the DIW. The Au-MCC fabricated in Example 1 was disposed on the negative feeding electrode such that the microelectrodes were facing the graphite rod closest to the negative feeding electrode. A DC voltage of 45 V was applied across the feeding electrodes for a duration of 24 hours. Magnet stirring was added to the cell during the process using a 1 cm magnet rod with a rotational speed of about 150 rpm. Vertically aligned rGO was deposited on the Au microelectrodes of the Au-MCC during the process, resulting in an MSC. The MSC was then detached from the SS feeding electrode and immersed in AZ® EBR solvent for 120 s to remove the sacrificial photoresist between the microelectrode fingers. The MSC was then thoroughly rinsed in IPA and DIW and then dried with N$_2$ gas.

Example 3

Figures 2A, 2B, 2C:
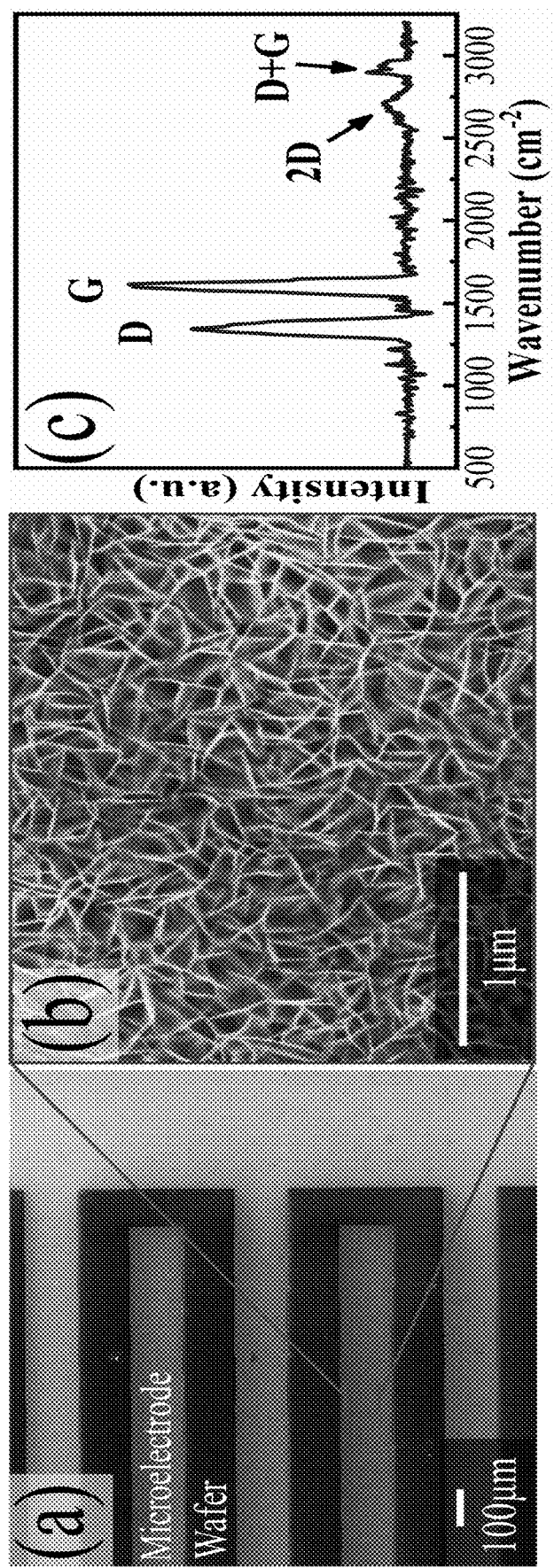
FIG. 2(*a*) shows a low magnification scanning electron microscope (SEM) image of microelectrodes on a wafer, as part of an interdigitated MCC. The scale bar is 100 micrometers (μm).

The MSC fabricated in Example 2 was analyzed. FIG. 2(a) shows a low-magnification SEM micrograph of the finger-like microelectrodes of the MSC. FIG. 2(b) presents a higher magnification SEM of the deposited graphene, which shows the formation of high surface area and porous structure of vertically aligned graphene nanosheets. It can be seen that graphene sheets (with dimensions on the order of several hundred of nanometers) formed a porous network on the current collector. Such geometrical features are expected to be favorable for the high-frequency response and power performance of MSC devices by facilitating the rapid diffusion of ionic species. FIG. 2(c) presents the Raman spectrum of the deposited graphene on the Au-MCC substrates depicting typical Raman peaks of graphene materials (i.e., D-band at ~1350 cm$^{-1}$, G-band at ~1609 cm$^{-1}$, 2D peak at ~2700 cm$^{-1}$, and D+G peak ~2910 cm$^1$). It can be seen that the intensity of the D-band is lower than that of the G-band, which confirms the formation of highly reduced graphene oxide (rGO) on the surface ($I_D$ to $I_G$ intensity ratio is about 0.78).

Example 4

Figures 3A, 3B, 3C:
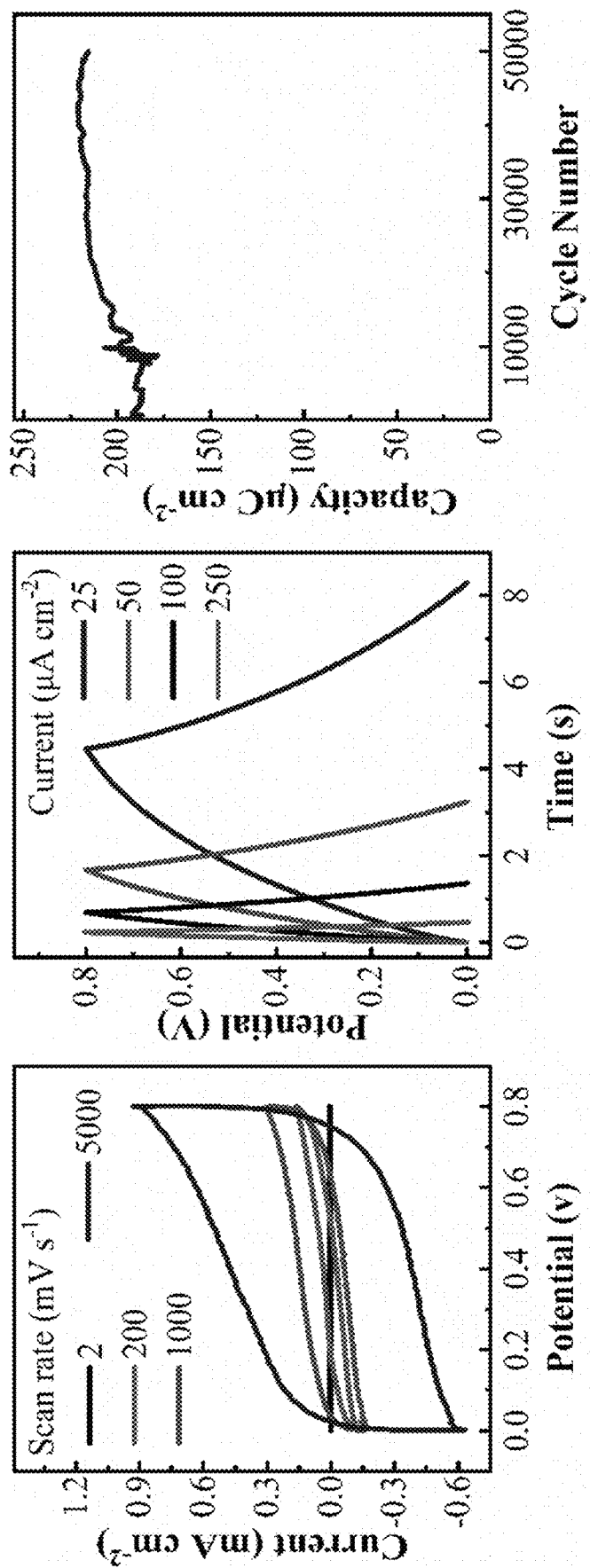
FIG. 3(*a*) shows a plot of current density (in milliamps per square centimeter ($mA/cm^2$)) versus potential (in Volts (V)), showing cyclic voltammetry at scan rates of 2 millivolts per second (mV/s), 200 mV/s, 1000 mV/s, and 5000 mV/s. The curve with the generally highest and lowest current density values is for 5000 mV/s, followed by 1000 mV/s, 200 mV/s, and 2 mV/s as you go inward towards 0 $mA/cm^2$.

CV, GCD, and EIS measurement techniques were conducted to study the time domain and frequency domain performance of the MSC fabricated in Example 2, and the as-is Au-MCC substrate fabricated in Example 1 for comparison. FIG. 3(a) presents the CV results for the MSC. The shapes of the curves are almost rectangular without any detectable current peaks over the covered voltage window from 0 V to 0.8 V. This indicates that no faradic reactions were taking place on the electrodes of these devices and that the charge storage mechanism is predominantly physical through the formation of double-layer structure. An increased tilting of the CV profiles with respect to the x-axis at higher charging/discharging rates occurred, which is indicative of increased resistive behavior in the device at the expense of capacitive energy storage.

The GCD results for the MSC at different current densities is shown in FIG. 3(b). The GCD curves show relatively symmetric and quasi-triangular shapes at all tested current densities indicating close-to-ideal capacitive behavior for the MSC. In the GCD test, the sudden voltage drop at the beginning of the discharge curve is typically associated with the irreversible ohmic losses (iR$_s$ drop) in the series resistance of the MSCs. The GCD curves obtained do not show a substantial voltage drop for any of the applied current densities, indicating relatively low internal resistance of the MSCs. A comparison between the discharge time of the Au-MCC and rGO-MSC devices revealed the deposition of rGO by bipolar electrochemistry technique significantly increased the capacity of the MSCs for storing the charge. Discharge time increased by about 30 times (from 0.126 s to 3.829 s) at the discharge current of 25 µA/cm².

The non-ideal capacitive features in the current-voltage and voltage-time profiles are well-known for electrochemical capacitive devices (i.e., nonlinear charge-voltage profiles and thus non-constant, voltage, and rate-dependent characteristic capacitance function). In response to an applied voltage, a net charge is accumulated on the surface of an electrode, which brings electrolytic counterions from the immediate vicinity of the electrode surface to rearrange themselves accordingly to balance this charge. The layer of charge in the electrolyte is then balanced by the formation of a second layer of concentration-dependent, diffuse charge. Subsequently, when the electrode voltage is changed (and depending on its rate), as is the case in CV tests, for instance, the ions in the double-layer structure rearrange and generate a current. Therefore, from the current-voltage dynamics (CV) and voltage-time profiles (GCD) it is difficult to estimate a characteristic capacitive function from the simple division of charge by voltage. Nonetheless, for the sake of comparison, the ratio C=2∫i(V)dV/(vΔVA) (in units of Coulombs per V per square centimeter (C/V·cm²) using data from the CV curves, where C can be viewed as averaged value relating the voltage-averaged current (expressed by $\bar{I}=\Delta V^{-1}\int i(V)dV$) to the voltage scan rate v, and normalized with respect to the microelectrode's geometric area A on each electrode side of the MSCs. The computed values of C at the different scan rates of 2, 10, 50, 100, 200, 1000 and 5000 mV/s were found to be 640, 454, 346, 315, 281, 194, and 161 C/V-cm² (equivalent to µF/cm²), respectively for the MSC, and 61, 27, 12, 9, 8, 7 and 5 C/V-cm² (equivalent to µF/cm²), respectively for the Au-MCC device. Applying the cyclic triangular excitation in CV with the voltage scan rates of 2, 10, 50, 100, 200, 1000 and 5000 mV/s is similar to exciting the device at the fundamental frequencies of 1.25 mHz, 6.25 mHz, 31.25 mHz, 62.5 mHz, 125 mHz, 625 mHz, and 3.125 Hz, respectively, which explains the decrease in values of $\bar{C}$ as the scan rate is increased, as will be discussed further in Example 5 below.

In order to investigate the capacity retention and cyclic performance of the fabricated devices, an MSC was charged and discharged 50,000 successive times at the current density of 25 µA/cm². FIG. 3(c) shows a plot of discharge capacity versus cycle number. The 12% relative increase of capacity from the first to the last cycle without fading indicates an excellent stability performance of the device. Such behavior can be explained by the electrochemical activation of the carbon materials during the charge-discharge process and/or an increased wettability of the electrodes.

Example 5

EIS analysis was conducted to study the performance of the MSCs (as fabricated in Example 2) as a function of frequency. The Nyquist plots, which are the illustration of the imaginary (−Im(Z)) versus real (Re(Z)) parts of the impedance, are presented in FIG. 4(a). The impedance of an ideal capacitor is purely imaginary and does not have a real part (i.e., Z=−j/(ωC) with C being the capacitance and w the angular frequency), i.e., vertical line parallel to the y-axis. Both the Au-MCC and the MSC (fresh or after 50,000 charge/discharge cycles) showed some small deviations from the ideal capacitive behavior without any sizable, diffusion-related Warburg region. Therefore, an equivalent circuit model was used with a series resistance $R_s$ with a constant phase element (CPE) of total impedance being as in Equation (1)

$$Z = R_s + \frac{1}{(j\omega)^\alpha C_\alpha} \quad (1)$$

to fit the data from 100 mHz to about 50 kilohertz (kHz). In this model, the value of a is between 1 and 0, $C_\alpha$ is a positive constant in units of F s$^{\alpha-1}$ ((Farads×(seconds)$^{\alpha-1}$), which is a mathematical term that does not have any physical meaning), and $$j^\alpha = \cos\left(\frac{\alpha\pi}{2}\right) + j\sin\left(\frac{\alpha\pi}{2}\right)$$

(Euler formula). At the limiting values of 1 and 0 for α, the impedance function simplifies to that of an ideal capacitor and a resistor, respectively. Using Equation (1), and by manually setting the values of $R_s$ taken from the high-frequency intercepts of the impedance data with the real axis, an impedance phase angle $$-\frac{\alpha\pi}{2} = -83 \text{ degrees (deg)}$$

can be determined for the Au-MCC device, whereas the phase angle for the MSC was −73 deg before cycling and −78 deg after cycling.

Figures 4A, 4B, 4C, 4D:
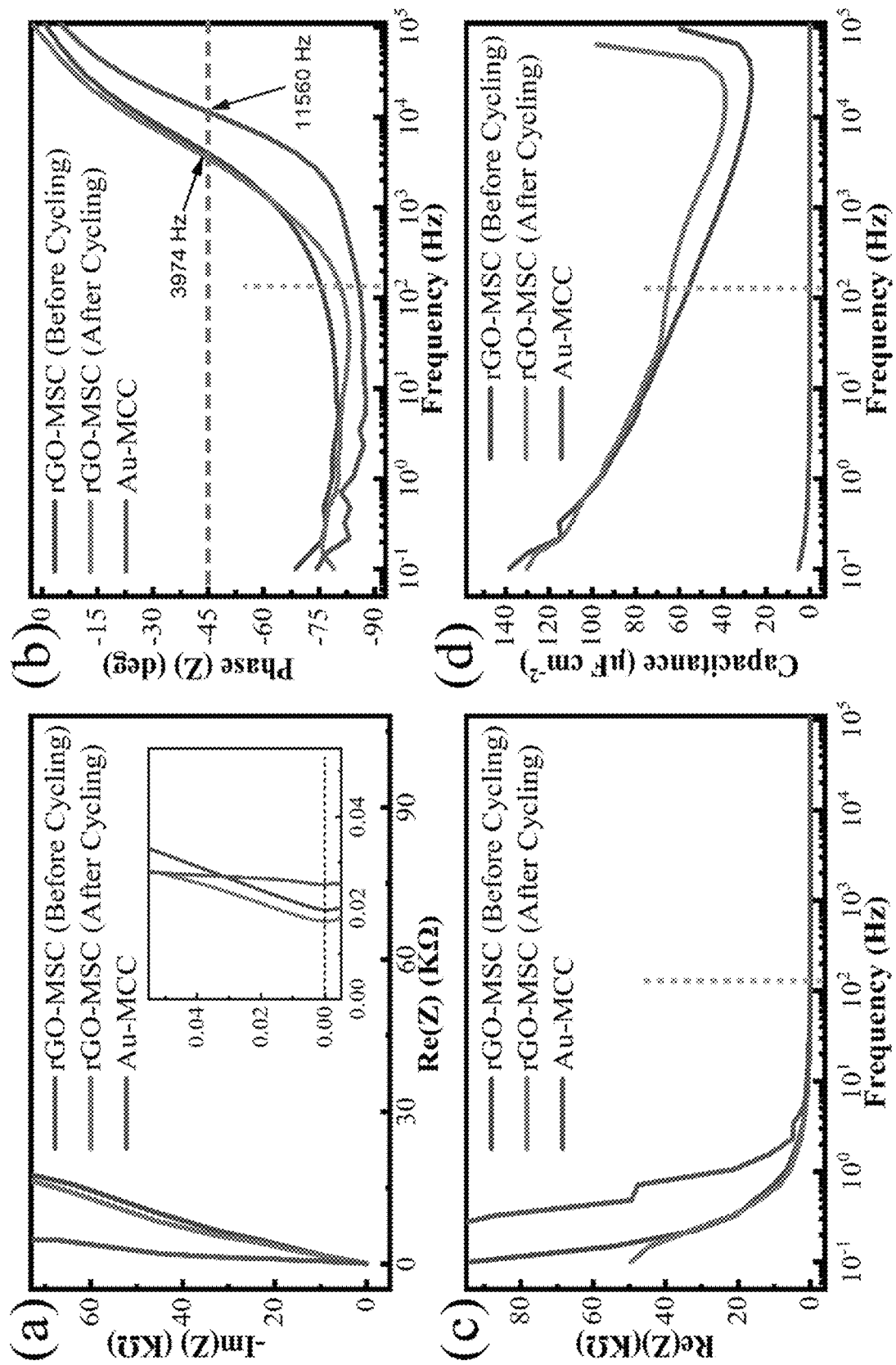
FIG. 4(*a*) shows a plot of −Im(Z) (in kilo-Ohms (kΩ)) versus Re(Z) (in kΩ), showing a Nyquist plot of the complex-plane representation of the imaginary part of impedance (Z) versus the real part of impedance, for an Au-MCC, an rGO-MSC before cycling, and an rGO-MSC after cycling. The curve with the highest −Im(Z) value at Re(Z) of about 5 is for the gold (Au) MCC (Au-MCC); the curve with the highest depicted −Im(Z) value at Re(Z) of about 10 is for the rGO-MSC after cycling; and the curve with the lowest −Im(Z) value at Re(Z) of about 10 is for the rGO-MSC before cycling.

This can also be illustrated from the Bode phase plots in FIG. 4(b), knowing that the phase angle for an ideal capacitor is −90 deg, independently of the frequency and voltage. As it can be seen, all of the devices showed some deviations from the ideal capacitive behavior with relatively constant phase angle in the low-frequency region (lower than ~1000 Hz for the MSCs and lower than ~5000 Hz for the Au-MCC). The minimum phase angle for the MSC after cycling and the Au-MCC were −83.2 deg and −87.7 deg, respectively. Moreover, as the frequency increased, the phase angles tended quickly towards the resistive behavior of zero impedance phase angle. When the phase angle is between −90 deg and −45 deg, the imaginary part of the impedance is larger than the real part. The frequency at which the imaginary and real parts become equal (i.e., phase angle is −45 deg) is called the cut-off frequency or characteristic frequency ($f_0$) that is commonly used as a figure of comparison between devices (see also the table in FIG. 6). This parameter reveals up to what frequency range the device can be more effectively used as a capacitive energy storage, albeit with some resistive losses that depend on the extent of the dispersion coefficient α. The inverse of the cut-off frequency is referred to as the relaxation time constant ($\tau_0=1/f_0$), which is the minimum time needed to discharge all the energy from the device with an efficiency greater than 50%. From FIG. 4(b), the cut-off frequency for the Au-MCC was found to be as high as 11,560 Hz. For the MSC, a cut-off frequency of 3974 Hz was found for the freshly prepared device, whereas after 50,000 consecutive charge/discharge cycles with 25 µA/cm², that value dropped to just 3486 Hz, attesting to the excellent (mechanical and chemical) stability of the rGO material and the MSC design and fabrication technique. The corresponding relaxation time constants are 8.6 microseconds (µs) for the Au-MCC, and 251 µs and 286

µs for the MSC before cycling and after cycling, respectively. Compared to other microcapacitors (see also FIG. 6), the results indicate that the bipolar electrochemistry-based vertically aligned rGO delivered one of the shortest time constants.

The real part of the impedance as a function of frequency for the tested devices is plotted in FIG. 4(c). All devices showed very low resistance (0.03 kΩ) at frequencies higher than 1 Hz. Specifically, at 120 Hz, the devices showed mostly capacitive behavior with negligible resistive behavior. The capacitance of MSCs at different frequencies can be computed from $Im(Z)=-j/(\omega C)$, where $\omega=2\pi f$, which has been further normalized with respect to the geometrical area of the current collector at each side. The plot is provided in FIG. 4(d). At the frequencies of 0.1 Hz, 1 Hz, and 1250 Hz, the corresponding capacitance for the MSC after 50,000 GCD cycles was found to be 130 µF/cm$^2$, 96 µF/cm$^2$, and 52 µF/cm$^2$ respectively; whereas for the Au-MCC it was 5.29 µF/cm$^2$, 0.59 µF/cm$^2$, and 0.0011 µF/cm$^2$, respectively. These results are consistent with those of the CV and GCD tests.

In order to put things into further perspective, some recently reported performances of MSCs designed to operate at high frequencies and AC filtering applications are summarized in the table in FIG. 6, in which the MSC fabricated in Example 2 is referred to as "Present work" and has its data presented in the last line. The data is summarized based on the characteristic frequency ($f_0$), the phase angle at 120 Hz ($\varphi_{120}$), and the specific areal capacitance computed at 120 Hz either using frequency domain analysis or at 200 V/s$^1$ (i.e., the fundamental frequency of 100 Hz for a voltage window of 1 V). Referring to FIG. 6, it can be appreciated that the MSC fabricated in Example 2 is one of the best performing devices. It is worth noting that the frequency-domain definition of capacitance being the division of frequency-domain charge by voltage is better recommended for characterizing non-ideal capacitive devices as it is in line with the definition of impedance. Further, if such a definition is assumed, the appropriate way for computing the corresponding time-domain capacitance function is by deconvolution (convolution theorem of the Fourier transform) and not the division of charge by voltage as done for the computation of C.

Example 6

Figures 5A, 5B, 5C, 5D:
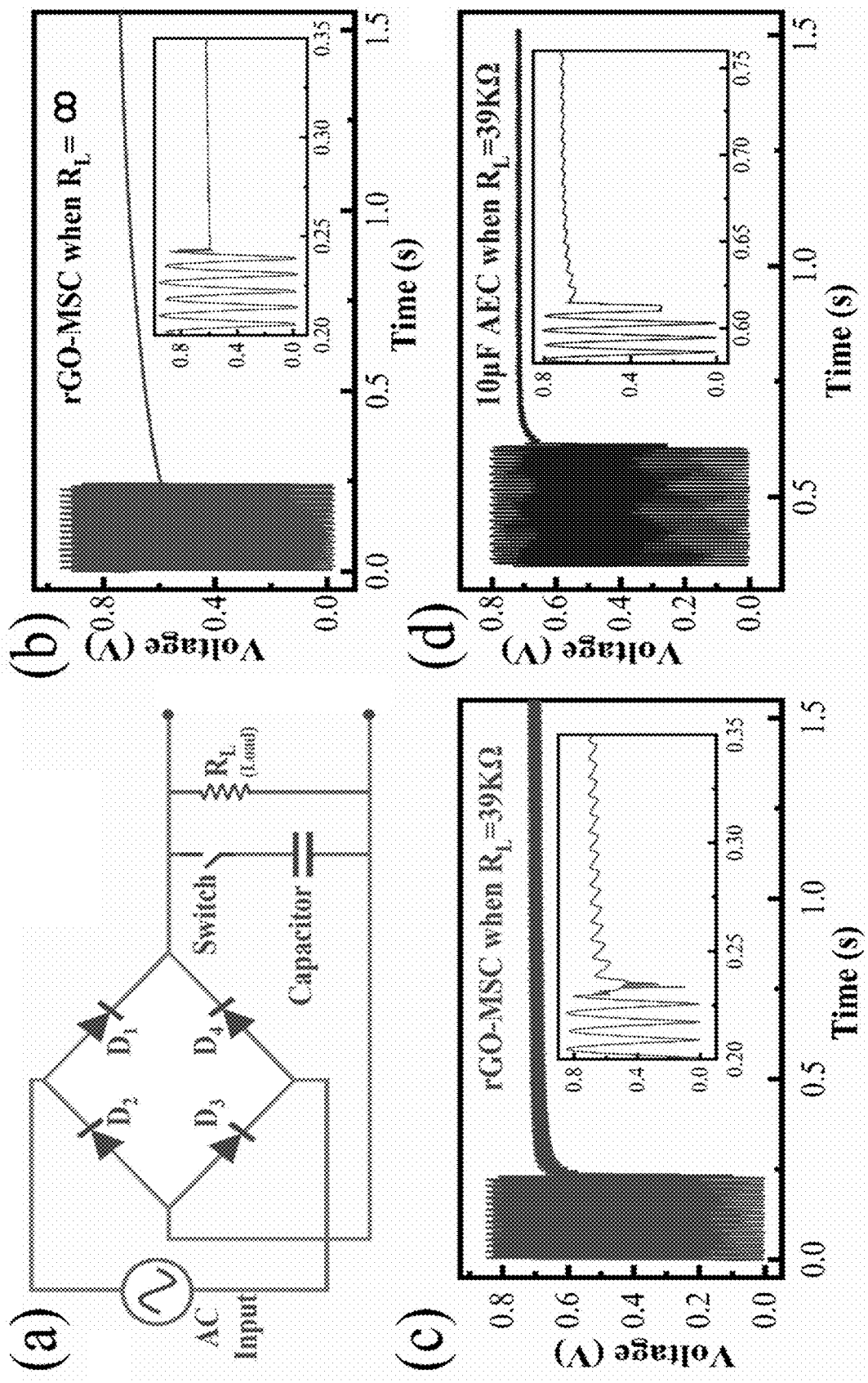
FIG. 5(*a*) shows a schematic of a circuit used as an alternating current (AC) to direct current (DC) convertor.

In order to evaluate the practical application of the MSC (fabricated in Example 2) at high frequencies, it was tested in an AC-DC filtering circuit (see FIG. 5(a); see also the Materials and Methods section for more details). The voltage output when the MSC device was not connected to any load (R=infinity) is illustrated in FIG. 5(b). Referring to FIG. 5(b), the pulsing 120 Hz, $V_{peak}\approx+0.8$ V rectified signal was perfectly flattened when the MSC was connected to the circuit (switch on). However, it is worth noting that it is essential to have a parallel load to the capacitive device in order to evaluate its performance in proper AC filtering applications. The flattening can be done at open circuit conditions with any device that has even a parasitic capacitance at the target frequency. In contrast, when a load is connected to the circuit, it will drain the stored energy from the capacitor at the moment where the input voltage is lower than that across the capacitor. In this situation, the magnitude of the fluctuations (ripple) in the flattened signal will change as a function of the stored capacity at that specific frequency. For this reason, the proper performance of the MSC device as a filtering capacitor was evaluated when a resistor (R=1 kΩ, 39 kΩ, and 100 kΩ) was added to the circuit as a working load. The typical filtering performance with a 39 kΩ resistor is plotted in FIG. 5(c), showing that the MSC could successfully filter the pulsing signal even when a resistor simultaneously discharged it. The same experiment was conducted using a 10 µF AEC, and the results are shown in FIG. 5(d). Although the nominal capacitance of the AEC was almost three times higher than that of the MSC device (10 µF versus 3.13 µF at 120 Hz), the filtering outputs of the two devices are similar. However, the AEC (volume of about 215 mm$^3$) is much bulkier compared to the miniaturized on-chip MSC.

The high-frequency response of the MSC can be attributed to the miniaturized MSC design, and thus the shorter length for ionic diffusion in response to external excitations, in addition to the highly structured and stable vertically aligned rGO electrodes obtained by bipolar electrochemistry, which permits high charge storage capabilities. It should also be noted that bipolar electrochemistry has excellent compatibility with semiconductor processing and could be applied to not only graphene but also other 2D layered materials for forming morphogenic materials and interfaces with controllable morphologies, orientation, and structures. In principle, the ease of fabrication of microstructured electrodes and devices by the versatile, cost-efficient, and environmentally-friendly bipolar electrochemistry process of embodiments of the subject invention can be applied for fabricating other micro-sized electronic devices such as batteries, sensors, electrochemical transistors, memristors, etc.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A microsupercapacitor (MSC), comprising:
   a plurality of interdigitated microelectrodes; and
   reduced graphene oxide (rGO) disposed on the plurality of interdigitated microelectrodes,
   a combined total surface area of an upper surface of each interdigitated microelectrode of the plurality of interdigitated microelectrodes being no more than 30 square millimeters (mm$^2$),
   the MSC having an average capacitance of at least 500 microFarads per square centimeter (µF/cm$^2$) at a scan rate of 2 millivolts per second (mV/s),
   the rGO being disposed on the plurality of interdigitated microelectrodes as vertically aligned nanosheets of the rGO, and
   the rGO covering at least 95% of the upper surface of each interdigitated microelectrode of the plurality of interdigitated microelectrodes.

2. The MSC according to claim 1, the MSC comprising no rGO in any spaces between the interdigitated microelectrodes of the plurality of interdigitated microelectrodes, and
   the rGO being present only on the upper surfaces of the interdigitated microelectrodes of the plurality of interdigitated microelectrodes and not on any other surfaces thereof.

3. The MSC according to claim 1, further comprising a substrate on which the plurality of interdigitated microelectrodes is disposed.

4. The MSC according to claim 1, the interdigitated microelectrodes of the plurality of interdigitated microelectrodes each comprising a metal material or a carbon cloth.

5. The MSC according to claim 1, the interdigitated microelectrodes of the plurality of interdigitated microelectrodes each comprising gold.

6. The MSC according to claim 1, comprising a first microelectrode side and a second microelectrode side physically separated from the first microelectrode side,
the first microelectrode side comprising half of the interdigitated microelectrodes of the plurality of interdigitated microelectrodes, and
the second microelectrode side comprising half of the interdigitated microelectrodes of the plurality of interdigitated microelectrodes.

7. The MSC according to claim 1, a total volume of the MSC being less than 0.2 cubic millimeters ($mm^3$).

8. A method of fabricating a microsupercapacitor (MSC), the method comprising:
preparing a micro-current collector (MCC) comprising a substrate, a plurality of interdigitated microelectrodes disposed on the substrate, and a sacrificial photoresist disposed on the substrate such that only an upper surface of each interdigitated microelectrode of the plurality of interdigitated microelectrodes is exposed;
disposing the MCC on a negative feeding electrode;
providing a positive feeding electrode, a first bipolar electrode, a second bipolar electrode, and the negative feeding electrode with the MCC disposed thereon in water, the first bipolar electrode and the second bipolar electrode each comprising graphite, and the MCC being disposed such that the plurality of interdigitated microelectrodes faces at least one of the first bipolar electrode and the second bipolar electrode;
applying a direct current (DC) voltage to the positive feeding electrode and the negative feeding electrode to perform a single-step exfoliation, reduction, and deposition of graphene nanosheets on the plurality of interdigitated microelectrodes to produce the MSC, the graphene nanosheets deposited on the plurality of interdigitated microelectrodes comprising reduced graphene oxide (rGO);
removing the MSC from the negative feeding electrode; and
performing a first cleaning the MSC to remove the sacrificial photoresist from the substrate,
the fabricated MSC comprising the plurality of interdigitated microelectrodes and the rGO disposed on the plurality of interdigitated microelectrodes,
a combined total surface area of an upper surface of each interdigitated microelectrode of the plurality interdigitated microelectrodes being no more than 30 square millimeters ($mm^2$),
the MSC having an average capacitance of at least 500 microFarads per square centimeter ($\mu F/cm^2$) at a scan rate of 2 millivolts per second (mV/s),
the rGO being disposed on the plurality of interdigitated microelectrodes as vertically aligned nanosheets of the rGO, and
the rGO covering at least 95% of the upper surface of each interdigitated microelectrode of the plurality of interdigitated microelectrodes.

9. The method according to claim 8, the preparing of the MCC comprising:
disposing a first photoresist on the substrate;
patterning the first photoresist using a mask and first radiation to give a first patterned photoresist;
developing the first patterned photoresist;
disposing a material of the plurality of interdigitated microelectrodes on the substrate and the first patterned photoresist;
performing a lift-off step to remove the first patterned photoresist, resulting in the plurality of interdigitated microelectrodes disposed on the substrate;
depositing a second photoresist on the substrate and the plurality of interdigitated microelectrodes;
patterning the second photoresist using the mask and second radiation to give a second patterned photoresist; and
developing the second patterned photoresist, resulting in the sacrificial photoresist and the plurality of interdigitated microelectrodes disposed on the substrate.

10. The method according to claim 8, further comprising:
after performing the first cleaning the MSC to remove the sacrificial photoresist from the substrate, performing a second cleaning on the MSC by washing the MSC in a solvent and deionized water and drying the MSC with a gas.

11. The method according to claim 8, the water in which the positive feeding electrode, the first bipolar electrode, the second bipolar electrode, and the negative feeding electrode are disposed being deionized water with no additives.

12. The method according to claim 8, the first bipolar electrode being a first graphite rod,
the second bipolar electrode being a second graphite rod, and
the first bipolar electrode and the second bipolar electrode being connected to each other by that is disposed entirely outside the water.

13. The method according to claim 8, the rGO being present only on the upper surfaces of the interdigitated microelectrodes of the plurality of interdigitated microelectrodes and not on any other surfaces thereof, and
the MSC comprising no rGO in any spaces between the interdigitated microelectrodes of the plurality of interdigitated microelectrodes.

14. The method according to claim 8, the interdigitated microelectrodes of the plurality of interdigitated microelectrodes each comprising a metal material or a carbon cloth.

15. A microsupercapacitor (MSC), comprising:
a substrate;
a plurality of interdigitated microelectrodes disposed on the substrate; and
reduced graphene oxide (rGO) disposed on the plurality of interdigitated microelectrodes,
a combined total surface area of an upper surface of each interdigitated microelectrode of the plurality of interdigitated microelectrodes being no more than 30 square millimeters ($mm^2$), and
the MSC having an average capacitance of at least 500 microFarads per square centimeter ($\mu F/cm^2$) at a scan rate of 2 millivolts per second (mV/s),
the MSC comprising no rGO in any spaces between the interdigitated microelectrodes of the plurality of interdigitated microelectrodes,
the rGO being present only on the upper surfaces of the interdigitated microelectrodes of the plurality of interdigitated microelectrodes and not on any other surfaces thereof,
the interdigitated microelectrodes of the plurality of interdigitated microelectrodes each comprising gold, the rGO covering at least 95% of the upper surface of each interdigitated microelectrode of the plurality of interdigitated microelectrodes, the rGO being disposed on the plurality of interdigitated microelectrodes as vertically aligned nanosheets of the rGO, the MSC comprising a first microelectrode side and a second microelectrode side physically separated from the first microelectrode side, the first microelectrode side comprising half of the interdigitated microelectrodes of the plurality of interdigitated microelectrodes, the second microelectrode side comprising half of the interdigitated microelectrodes of the plurality of interdigitated microelectrodes, and a total volume of the MSC being less than 0.2 cubic millimeters ($mm^3$).

* * * * *